(12) United States Patent
Anand et al.

(10) Patent No.: US 12,033,189 B2
(45) Date of Patent: *Jul. 9, 2024

(54) METHOD, SYSTEM, AND APPARATUS FOR PROGRAMMATICALLY DETERMINING AND ADJUSTING ELECTRONIC BID VALUES FOR A DIGITAL CONTENT OBJECT

(71) Applicant: GROUPON, INC., Chicago, IL (US)

(72) Inventors: Rahul Anand, Sunnyvale, CA (US); Sandeep Dey, Bellevue, WA (US); Pravin P. Thampi, Kirkland, WA (US); Zhi Guo, Sammamish, WA (US)

(73) Assignee: ByteDance Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,488

(22) Filed: Apr. 17, 2023

(65) Prior Publication Data
US 2023/0368249 A1 Nov. 16, 2023

Related U.S. Application Data

(63) Continuation of application No. 16/228,519, filed on Dec. 20, 2018, now Pat. No. 11,657,431.

(60) Provisional application No. 62/608,421, filed on Dec. 20, 2017.

(51) Int. Cl.
| | | |
|---|---|---|
| G06Q 20/00 | (2012.01) | |
| G06N 20/00 | (2019.01) | |
| G06Q 30/0273 | (2023.01) | |
| H04L 67/01 | (2022.01) | |
| G06Q 30/0251 | (2023.01) | |

(52) U.S. Cl.
CPC ........ *G06Q 30/0275* (2013.01); *G06N 20/00* (2019.01); *H04L 67/01* (2022.05); *G06Q 30/0256* (2013.01)

(58) Field of Classification Search
None
See application file for complete search history.

(56) References Cited

U.S. PATENT DOCUMENTS

| | | | | |
|---|---|---|---|---|
| 6,059,733 | A * | 5/2000 | Brune | A61B 5/0031 600/549 |
| 8,682,721 | B1 * | 3/2014 | Kent | G06Q 30/08 705/14.43 |
| 10,036,219 | B1 * | 7/2018 | Sinn | E21B 33/06 |
| 10,497,010 | B1 | 12/2019 | Zhang et al. | |
| 2006/0265429 | A1 * | 11/2006 | Pendergast | G06Q 10/087 |
| 2007/0027760 | A1 | 2/2007 | Collins et al. | |
| 2009/0292599 | A1 * | 11/2009 | Rampell | G06Q 30/0211 705/14.23 |
| 2009/0319371 | A1 * | 12/2009 | Young | G06Q 30/0256 705/14.54 |

(Continued)

OTHER PUBLICATIONS

Hai; Electronic Bidding Software Design and Implementation; IEEE; pp. 423-428; 2015.*

(Continued)

*Primary Examiner* — Radu Andrei
(74) *Attorney, Agent, or Firm* — ALSTON & BIRD LLP

(57) ABSTRACT

Embodiments of the present disclosure provide methods, systems, and apparatuses for programmatically determining and adjusting electronic bid values for a digital content object using a machine learning model.

18 Claims, 6 Drawing Sheets

(56) References Cited

U.S. PATENT DOCUMENTS

2013/0073464 A1\* 3/2013 Magpayo ........... G06Q 30/0256
  705/44
2013/0191213 A1 7/2013 Beck et al.
2018/0308025 A1\* 10/2018 Bansal ................... G06N 3/02

OTHER PUBLICATIONS

Karlsson; Adaptive control using Heisenberg bidding; ACC; pp. 1304-1309; 2014.\*

Evert de Haan, Thorsten Wiesel, Koen Pauwels, The effectiveness of different forms of online advertising for purchase conversion in a multiple-channel attribution framework, IJRM, vol. 33, Issue 3, 2016, pp. 491507,https://doi.org/10.1016/j.ijresmar .2015.12.001. (Year: 2016).

Hai; Electronic Bidding Software Design and Implementation; ICMTMA 2015; pp. 423-428; 2015.

Karlsson; Adaptive control using Heisenberg bidding; ACC 2014; pp. 1304-1309; 2014.

\* cited by examiner

METHOD, SYSTEM, AND APPARATUS FOR
PROGRAMMATICALLY DETERMINING
AND ADJUSTING ELECTRONIC BID
VALUES FOR A DIGITAL CONTENT
OBJECT

CROSS-REFERENCE TO RELATED APPLICATIONS

The present application is a continuation of and claims priority to U.S. application Ser. No. 16/228,519, titled "METHOD, SYSTEM, AND APPARATUS FOR PROGRAMMATICALLY DETERMINING AND ADJUSTING ELECTRONIC BID VALUES FOR A DIGITAL CONTENT OBJECT," filed Dec. 20, 2018, which claims priority to U.S. Provisional Application Ser. No. 62/608,421, titled "METHOD, SYSTEM, AND APPARATUS FOR PROGRAMMATICALLY DETERMINING AND ADJUSTING ELECTRONIC BID VALUES FOR A DIGITAL CONTENT OBJECT," filed Dec. 20, 2017, the contents of which are incorporated herein by reference in their entirety.

BACKGROUND

Adjusting electronic bid values for digital content objects during different network time segments requires a multitude of considerations. Through applied effort, ingenuity, and innovation, many of these identified problems have been solved by developing solutions that are included in embodiments of the present disclosure, many examples of which are described in detail herein.

BRIEF SUMMARY

This specification relates to a method, system, and apparatus for programmatically determining and adjusting electronic bid values for a digital content object using a machine learning model. In one embodiment, a computing entity or apparatus is configured to receive, from one or more client devices, one or more transaction signals associated with the digital content object. The apparatus is further configured to programmatically generate a first set of cumulative transaction values. In embodiments, each cumulative transaction value of the first set of cumulative transaction values is associated with a different one of the one or more network time period segments within a first network time period. In embodiments, each cumulative transaction value of the first set of cumulative transaction values is programmatically generated based on a total number of the one or more transaction signals received during each of the one or more network time period segments within the first network time period.

The apparatus is further configured to programmatically generate a second set of cumulative transaction values. In embodiments, each cumulative transaction value of the second set of cumulative transaction values is associated with a different one of the one or more network time period segments within a second network time period. In embodiments, each cumulative transaction value of the second set of cumulative transaction values is programmatically generated based on a total number of the one or more transaction signals received during each of the one or more network time period segments within the second network time period.

The apparatus is further configured to programmatically generate an accrued cumulative transaction value for each of the one or more network time period segments based on cumulating the first set of cumulative transaction values for each of the one or more network time period segments within the first network time period and the second set of cumulative transaction values for each of the one or more network time period segments within the second network time period.

The apparatus is further configured to programmatically generate, using a machine learning model, a slope value based on the accrued cumulative transaction value for each of the one or more network time period segments. In embodiments, the slope value is associated with a particular network time period segment and indicates a transaction trend of the digital content object during the particular network time period segment.

The apparatus is further configured to programmatically adjust the electronic bid value of the digital content object during the particular network time period segment based at least on the slope value.

Other embodiments can each optionally include a machine learning model, where the machine learning model is a linear model. In embodiments, the linear model is a linear regression model associated with an r-squared value and a p-value.

Other embodiments can each optionally include a first threshold slope value, a second threshold slope value, a threshold r-squared value, and a threshold p-value. In embodiments, the first threshold slope value is 1, the second threshold slope value is −1, the threshold r-squared value is 0.75, and the threshold p-value is 10-5.

In circumstances where the slope value is larger than a first threshold slope value, the r-squared value is larger than a threshold r-squared value, or the p-value is smaller than a threshold p-value, the apparatus is additionally configured to increase the electronic bid value for the digital content object during the particular network time period segment associated with the slope value.

In circumstances where the slope value is smaller than a second threshold slope value, the r-squared value is not larger than the threshold r-squared value, or the p-value is not smaller than a threshold p-value, the apparatus is additionally configured to decrease the electronic bid value for the digital content object during the particular network time period segment associated with the slope value.

In other embodiments, the apparatus is additionally configured to programmatically generate one or more multiplier values associated with each of the one or more network time period segments for determining one or more new electronic bid values for the digital content object during each of the one or more network time period segments. In embodiments, each of the one or more multiplier values is associated with a respective slope value associated with the particular network time period segment indicating the transaction trend of the digital content object during the particular network time period segment.

In circumstances where the respective slope value is in a range of 1 to 10, the apparatus is additionally configured to programmatically generate a multiplier value associated with the particular network time period segment based on linearly scaling the respective slope value to a range of 1 to 1.5.

In circumstances where the respective slope value is in a range of −10 to −1, the apparatus is additionally configured to programmatically generate the multiplier value associated with the particular network time period segment based on linearly scaling the respective slope value to a range of 0.5 to 1.

In circumstances where the respective slope value is in a range of −1 to 1, the apparatus is additionally configured to programmatically generate the multiplier value associated with the particular network time period segment to be 1.

The apparatus is additionally configured to determine the one or more new electronic bid values for the digital content object during each of the one or more network time period segments by multiplying an existing electronic bid value for the digital content object by the one or more multiplier values associated with each of the one or more network time period segments.

Other embodiments include corresponding systems, methods, and computer programs, configured to perform the operations of the apparatus, encoded on computer storage devices.

Other embodiments can each optionally include one or more network time periods, where each of the one or more network time periods is associated with a start timestamp and a finish timestamp. In such embodiments, a time period between the start timestamp and the finish timestamp is 24-hours. In embodiments, each network time period is divided by one or more network time period segments, and each network time period segment is a 1-hour period.

In embodiments, the digital content object is a keyword.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
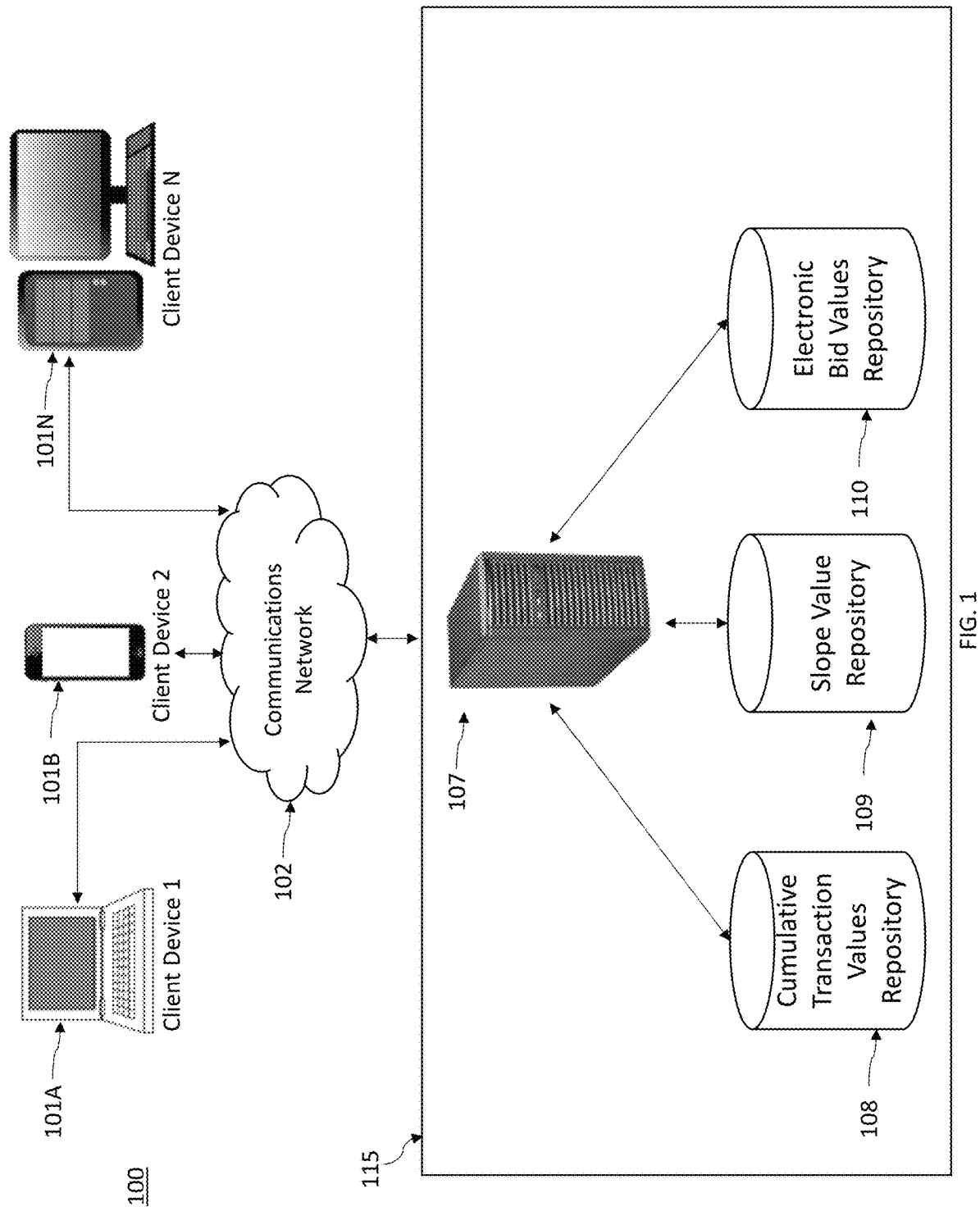
Figure 2:
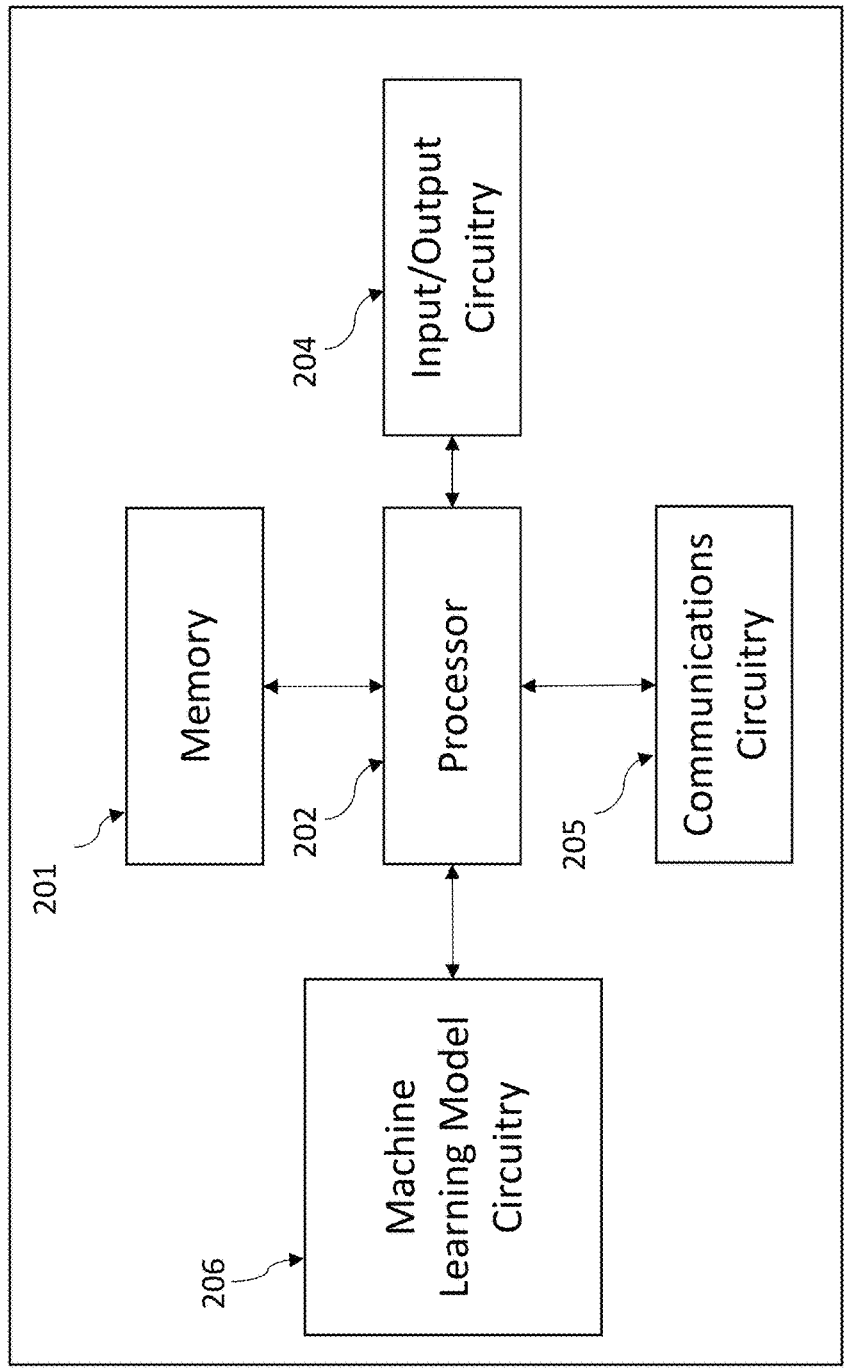
Figure 3:
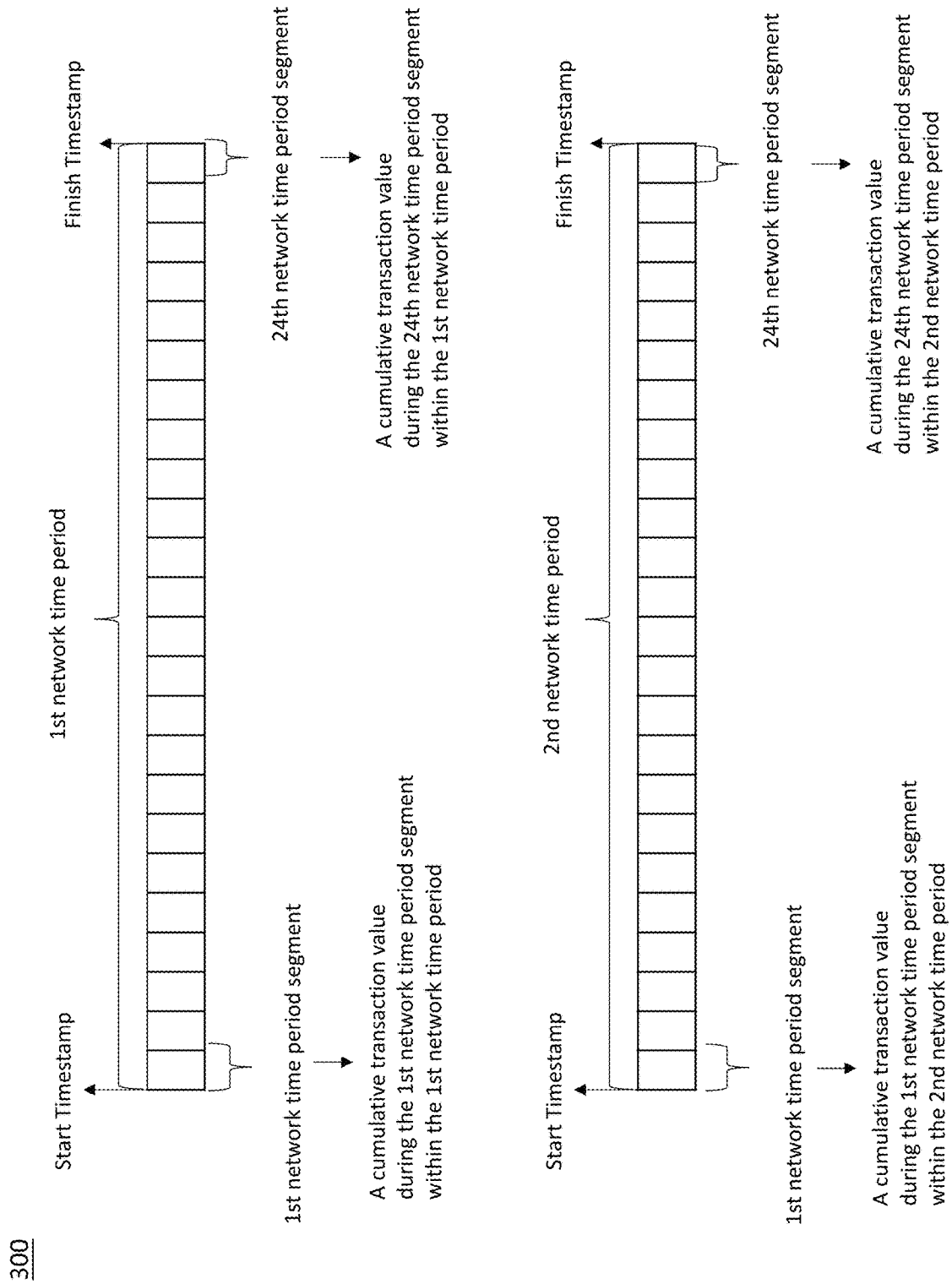
Figure 4:
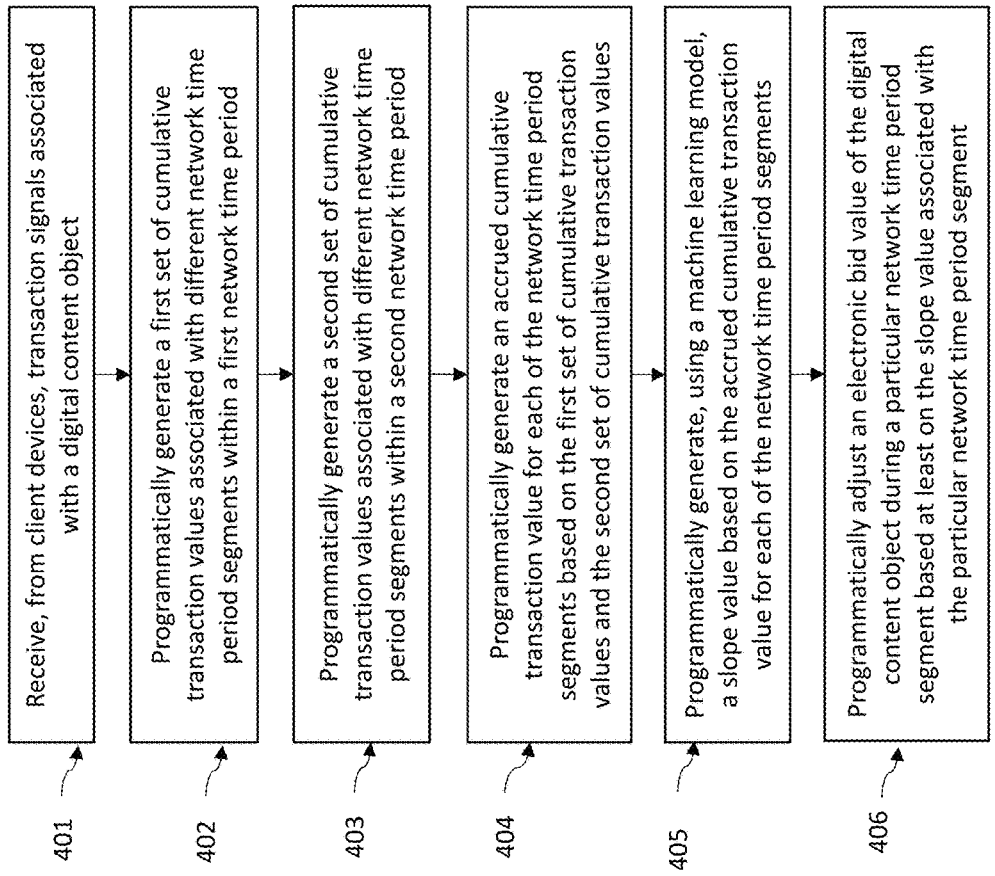
Figure 5:
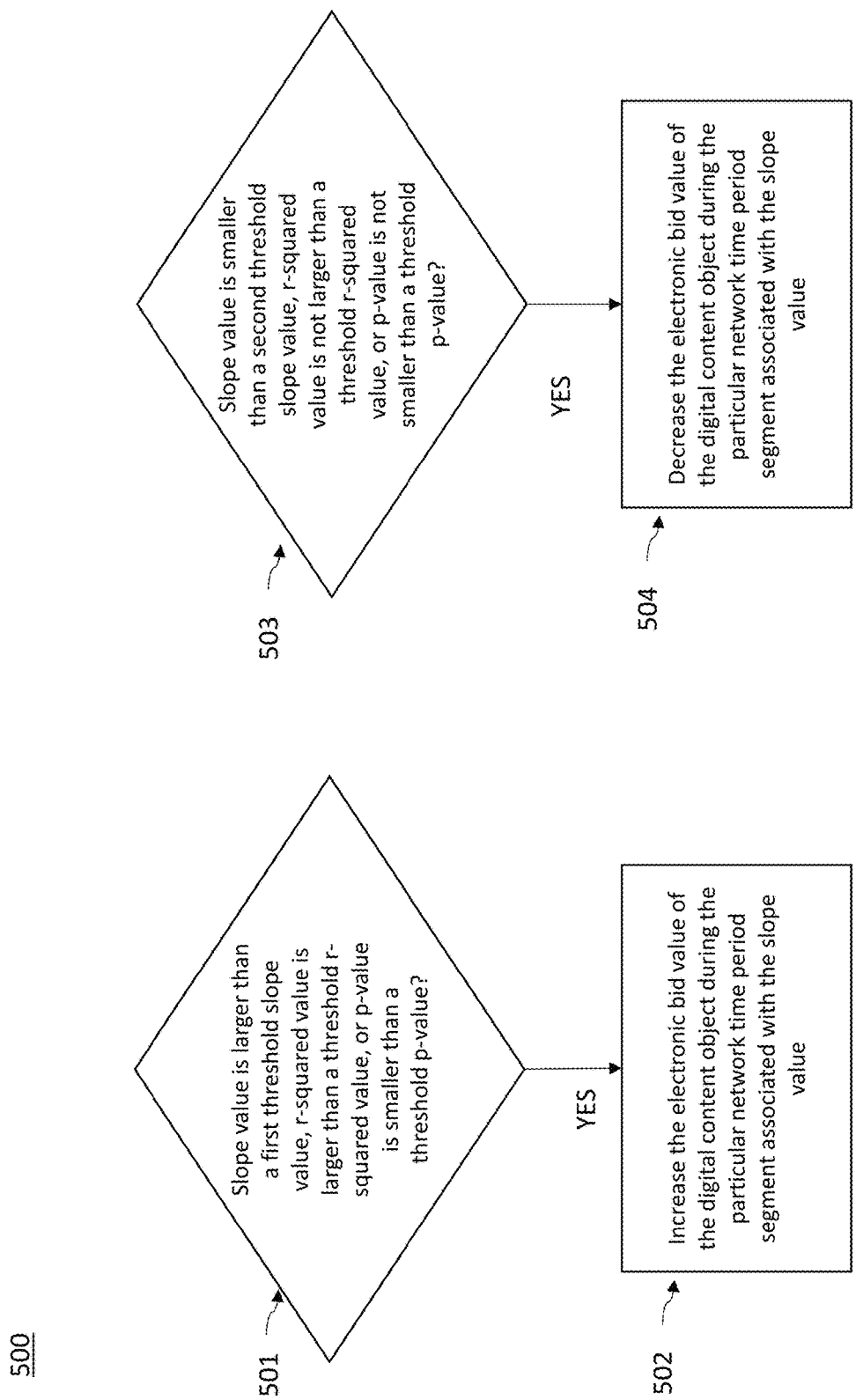
Figure 6:
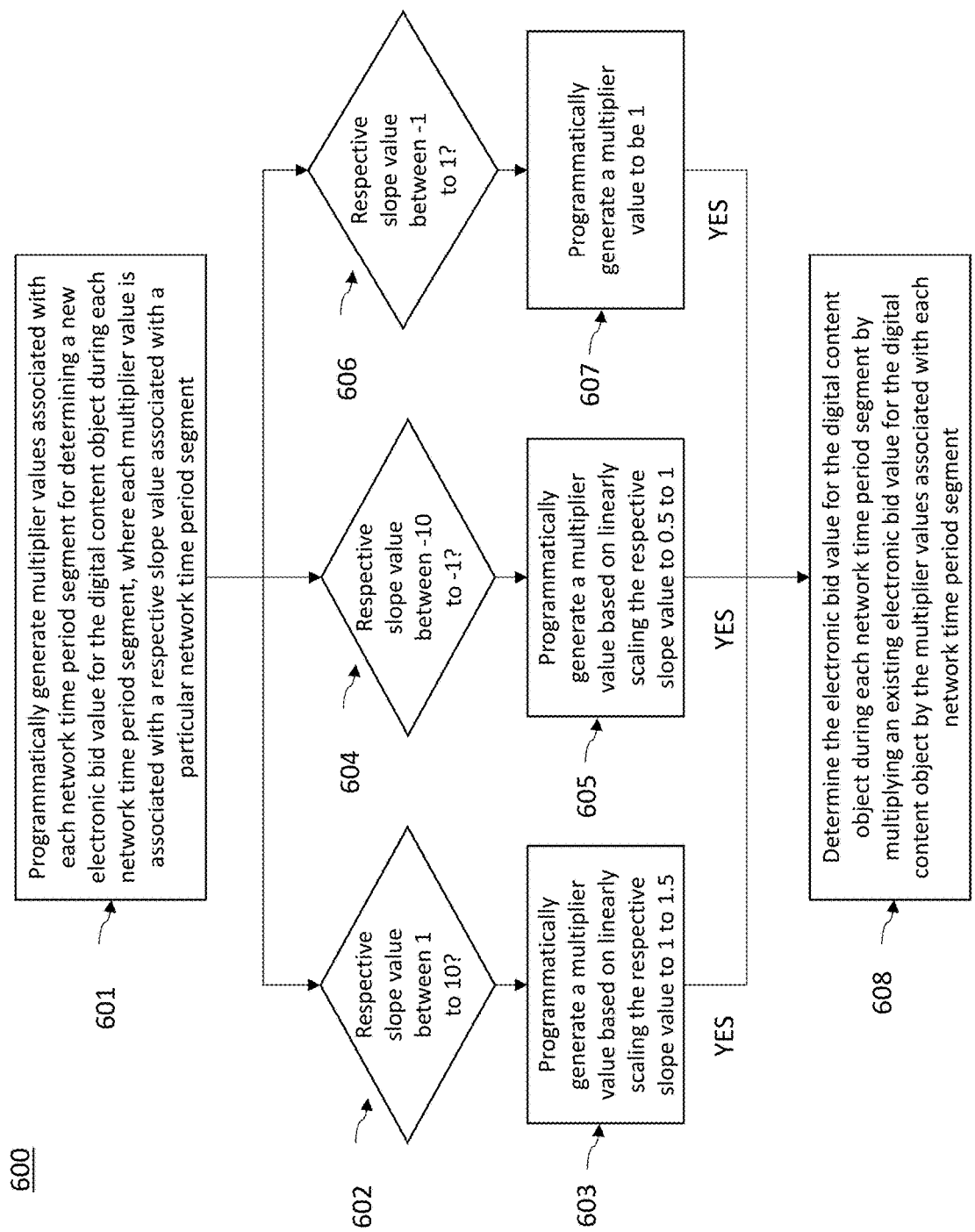

Having thus described the disclosure in general terms, reference will now be made to the accompanying drawings, which are not necessarily drawn to scale, and wherein:

FIG. 1 is an exemplary logical design diagram of a system configured to practice embodiments of the present disclosure;

FIG. 2 illustrates an exemplary schematic diagram of a computing entity according to one embodiment of the present disclosure;

FIG. 3 illustrates an exemplary plurality of network time periods, each divided by multiple network time period segments, according to one embodiment of the present disclosure;

FIG. 4 illustrates an exemplary process for adjusting an electronic bid value according to one embodiment of the present disclosure;

FIG. 5 illustrates an exemplary process for determining whether to increase or decrease an electronic bid value according to one embodiment of the present disclosure; and FIG. 6 illustrates an exemplary process for adjusting an electronic bid value of a digital content object based on multiplier values associated with respective slope values according to one embodiment of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the disclosure generally relate to programmatically determining and adjusting electronic bid values for a digital content object using a machine learning model.

Embodiments of the present disclosure enable predictive adjusting of (i.e., increase or decrease of) an electronic bid value for a digital content object during different network time segments in the context of search engine electronic advertisements or display network advertisements to increase interactions between a client device and electronic advertisements (e.g., and/or device rendered objects) associated with the digital content objects. A machine learning model is used to generate a slope value associated with a particular network time period segment. Based on the slope value, the electronic bid value may be increased or decreased during the particular network time period segment.

Furthermore, multiplier values are introduced in one embodiment of the present disclosure for dynamically determining an electronic bid value for a digital content object based on a transaction trend associated with the digital content object during a network time period. In such an embodiment, an electronic bid value for a digital content object during a particular network time period segment may be determined by multiplying a multiplier value by an existing electronic bid value for the digital content object. In embodiments, the multiplier value is associated with the particular network time period segment.

When interactions by client devices with digital content objects vary over network time periods, programmatically determining the most effective electronic bid value to associate with a digital content object is a computationally intensive and difficult challenge. Too high of an electronic bid value for the digital content object during a network time period where interactions with the digital content object may be minimal is a waste of network resources. Too low of an electronic bid value for the digital content object during a network time period where interactions with the digital content object are potentially many results in an imbalance of resources dedicated to an allocation of associated device rendered objects in a storage device. This results in an imbalance of data storage and unnecessary exhaustion of computing resources.

The inventors have identified that the system resources and time allocated to such electronic bid value determination are easily exhausted and compromised as a result of these challenges. The inventors have determined that the ability to dynamically adjust electronic bid values for digital content objects based on a machine learning model would reduce the computing resources and time necessary to perform such electronic bid value generation.

Definitions

As used herein, the terms "data," "content," "information," "digital content object," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. In embodiments, examples of digital content objects include keywords.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

As used herein, the terms "user," "client," "consumer," and "customer" may be used interchangeably to refer, without limitation, to a client, customer, purchaser, shopper, user and the like who may be using a client device to receive and interact with a device rendered object.

The term "device rendered object" may be used to refer to a set of executable instructions that, when executed by a processor of a computing device, renders an object for display. An example of a device rendered object can be an instrument of a promotion. The instrument may be any type of gift card, tender, electronic certificate, medium of exchange, voucher, or the like that embodies terms of a promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value, and/or a residual value. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiration or other violation of a redemption parameter, the return or exchange value of the instrument and/or the like.

In embodiments, each device rendered object has associated data indicating one or more categories (such as a restaurant promotion, a spa promotion, a travel promotion, a local promotion, etc.), sub-categories (such as a sushi restaurant), location, hyper-locations, prices or the like. For example, an object may be associated with a gym, and the gym may be associated with category data such as "beauty, wellness, and healthcare," "food and drink," "leisure offers and activities" and/or "services." A gym may also have more than one location, and may be able to provide promotions in a variety of price ranges and time frames. The device rendered object may be further associated with sub-category data such as "Chinese food" or "Mexican food."

As used herein, the term "device rendered object service" may include a service that is accessible via one or more computing devices and that is operable to provide device rendered object services on behalf of one or more providers that are offering one or more instruments that are redeemable for goods, services, experiences and/or the like. In some examples, the device rendered object service may take the form of a redemption authority, a payment processor, a rewards provider, an entity in a financial network, a promoter, an agent and/or the like. As such, the device rendered object service is, in some example embodiments, configured to present one or more device rendered objects (e.g., promotions) to client devices, accept payments for device rendered objects from client devices, issue instruments upon acceptance of an object, participate in redemption, generate rewards, provide a point of sale device or service, issue payments to providers and/or otherwise participate in the exchange of goods, services or experiences for currency, value and/or the like.

In the present embodiments, device rendered objects may have associated therewith one or more attributes. It should be understood that each of the attributes discussed in this application, may be in some embodiments a primary or a secondary attribute. A list of exemplary attributes is provided below.

In some implementations, one attribute may represent category data, specifically beauty, wellness and healthcare. To determine a normalized value of the one attribute, an algorithm may be executed on associated raw data related to a device rendered object transaction. For example, if the category data associated with a device rendered object transaction is "beauty, wellness and healthcare," the value of the one attribute is 1. If the category data associated with a device rendered object transaction is not "beauty, wellness and healthcare," the value of the one attribute is 0.

In some embodiments, a number of example attributes relate to category data and sub-category data. There is also a number of attributes related to location data. It should be understood that attribute data related to location and hyper location data may be generated in a similar fashion. For example, if the location data associated with a device rendered object transaction is "Chicago," the value of a corresponding attribute may be 1. If the category data associated with a device rendered object transaction is not "Chicago," the value of the corresponding attribute may be 0.

It should also be understood that device rendered object transactions may have associated data indicating one or more categories, sub-categories, location, hyper-locations, prices or the like. For example, a device rendered object transaction may be associated with a gym, and the gym may be associated with category data such as "beauty, wellness, and healthcare," "Food and drink," "Leisure Offers and Activities" and/or "Services." A gym may also have more than one location, and may be able to provide promotions in a variety of price ranges and time frames.

Example attribute data can also be associated with review websites such as Yelp®, Google®, Yahoo®, City Search®, Trip Advisor®. It should be understood that any review website could have associated attribute data, such as for example Zagat®, Bing® or the like. It should also be understood that attribute data associated with reviews related to one or more categories may be generated. For example, a website may provide reviews related to a provider's food, service, décor, price or the like. Attribute data may be generated related to each of one or more categories, such as a provider's food, service, décor, price, or the like.

It should also be understood that a location, hyper-location, category or sub-category may affect data available for the provider of a promotional transaction. For example, device rendered object transactions purchased from providers from different locations (e.g., different countries, states, neighborhoods or the like) may be associated with different attribute data. For example, different countries have different credit reporting rules and agencies. Thus, a promotion and marketing system may utilize a first combination of attributes for a device rendered object transaction from a provider in a first location, hyper-location, category or sub-category and a second combination of attributes for a device rendered object transaction from provider in a second location, hyper-location, category or sub-category.

In one implementation, other attribute data may be used. For example, attribute "bad month" may relate to identifying device rendered object transactions associated with booking months where prior device rendered object transactions have involved products, services, and/or other offerings in one or more categories categorized as having high return rates based on prior performance data. The feature may be normalized such that if the sub-category of the device rendered object transaction is associated with high return rates, the attribute is 1, else the attribute is 0. Other example attributes are "bad market," which may be normalized such that if the device rendered object transaction requires travel to a location and/or hyper local region associated with high return rates, the attribute is 1, else the attribute is 0. Another example feature is "average price for sub-category."

Similar attributes may be clustered, grouped, or aggregated. For example, attributes associated with locations or location based attributes may be grouped under header attribute "location." For example, a division attributes specifying a division where the promotion is offered and an attribute specifying a distance from a center of a city where a promotion is offered may be clustered under the location header attribute. Similarly, attributes associated with "past performance," "category & service," "completion," "maximum capacity," "hero score," "review data" may each also be clustered and/or grouped under header attributes. For example, with respect to device rendered object transaction associated with a merchant providing a service, attributes specifying past performance data can be for (1) the same merchant and the same service, (2) only the same merchant, (3) only the same service may be clustered under attribute header "past performance." Table A shows example attributes.

TABLE A

| Type | Features |
| --- | --- |
| Location | division, distance to city, etc. |
| past performance | same merchant & service, same service, same merchant, etc. |
| category & service | service header, primary deal service, etc. |
| booking month | holiday, pre-holiday, etc. |
| maximum capacity | units_avail, etc. |
| hero score | predicted 30 day bookings, predicted 60 day bookings, etc. |
| review data | yelp_n_review, yelp_rating, yelp_avil, google_n_review, facebook_fans, etc. |

The clustered or the non-clustered attributes may be used to train a machine learning model. It should be understood that the selection of attributes or clusters of attributes for training machine learning models can greatly affect the model performance. In some implementations, attributes and/or clusters of attributes are selected based on statistical analysis. In some implementations, selection of the most significant attributes is based on one or more different attribute selection approaches. These approaches may be (1) forward selection, which is starting with the most significant attributes and incrementally adding a next significant attribute until the model is stable; (2) backward elimination, which starts with all the attributes and exclude the non-significant attributes one by one until the model is stable; (3) a combination of forward selection and backward elimination; and (4) checking the significance of the attribute by statistical model (regression). In one embodiment, each attribute selection approach may give a subset of significant attributes. The attributes that are not shown to be significant by one or more of the attribute selection approaches may be excluded from the model.

The term "machine learning model" refers to a machine learning task. Machine learning is a method used to devise complex models and algorithms that lend themselves to prediction. A machine learning model is a computer-implemented algorithm that can learn from data without relying on rules-based programming. These models enable reliable, repeatable decisions and results and uncovering of hidden insights through machine-based learning from historical relationships and trends in the data.

A machine learning model is initially fit or trained on a training dataset (e.g., a set of examples used to fit the parameters of the model). The model can be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters (e.g. the number of hidden units in a neural network). In some embodiments, the machine learning model is a linear model.

As used herein, the term "linear model" refers to a class of machine learning algorithms that makes a prediction by using a linear function of input features associated with the a training dataset. Based on the training dataset, a machine learning model may compute one weight for each feature to form a linear model that can predict or estimate a validation dataset.

As used herein, the term "linear regression model" refers to a type of regression analysis for modeling a relationship between a set of predictor variables (also known as explanatory variables or independent variables) associated with a training dataset and a set of response variables (also known as outcome variables or dependent variables) associated with a validation dataset. A linear regression model may be associated with an r-squared value (or coefficient of determination value as defined below) and a p-value (or calculated probability value as defined below) representing the predictability of the linear regression model.

As user herein, the terms "r-squared value" and "coefficient of determination value" may be used interchangeably to refer to a statistical assessment of how close the data points associated with the training dataset are to the fitted regression line. The r-squared value is a value between 0 and 1. In circumstances where the r-squared value is 0.85, the predictor variables account for 85% of the response variables. In circumstances where the r-squared value is 1, all of the data points fall perfectly on the regression line, which means the predictor variables account for all of the response variables. In circumstances where the r-squared value is 0, the fitted regression line is horizontal, which means the predictor variables account for none of the response variables.

The term "threshold r-squared value" refers to a value used to determine whether the predictability of a fitted linear regression model is accountable. In circumstances where an r-squared value is larger than a threshold r-squared value, the predictability may be deemed as accountable.

As used herein, the terms "p-value" and "calculated probability value" may be used interchangeably to refer to a statistical assessment of the significance of a regression model. In circumstances where the p-value is low, the probability of the predictive result being wrong is minimal, and vice versa.

The term "threshold p-value" refers to a value used to determine whether a predictive result of a fitted linear regression model being wrong is in a significant level. In circumstances where a p-value is smaller than a threshold p-value, the predictive result being wrong may be minimal.

The term "device rendered object interaction" refers to electronic interaction with a device rendered object by a client device. In some examples, the device rendered object interaction may take the form of an accessing or selection of the device rendered object, a viewing of the device rendered object on an electronic display, a scrolling over the device rendered object, a retrieval of the device rendered object, a purchase transaction completed for the device rendered object, and/or the like.

The term "digital content object interaction" refers to electronic interaction with a digital content object (e.g., an interface element representing a keyword) by a client device. In some examples, the digital content object interaction may take the form of an accessing or selection of an electronic interface representation of the digital content object, a viewing of the digital content object on an electronic display, a scrolling over the digital content object, and/or the like.

In some embodiments, the interaction data (e.g., device rendered object or digital content object interaction data) may include various other interactions, including without limitation, mouse-over events and durations, the amount of time spent by the client device viewing particular content, the rate at which impressions of particular content result in sales associated with that content, demographic information associated with each particular client using the client device, data indicating other content accessed by the client device (e.g., browser cookie data), the time or date on which content was accessed, the frequency of impressions for particular content, associations between particular clients or client demographics and particular impressions, and/or the like.

The term "device rendered object interaction signal" refers to electronic indication that an interaction as defined above has occurred with respect to a particular device rendered object.

It should be appreciated that the term "programmatically expected" indicates machine prediction of occurrence of certain events.

As used herein, the term "likelihood" refers to a measure of probability for occurrence of a particular event. For example, the likelihood that a client device will interact with a device rendered object may be a value associated with a specific scale. In some implementations, the machine predictions discussed above and below are based, at least in part, on the "likelihood" that an event will occur. Similarly, in some implementations, machine predictions are based on attributes associated with a client profile and/or an associated device rendered object.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

As used herein, the term "keyword" refers to a search term, word, or phrase that are selected to be rendered as part of a search engine results interface displayed on a graphical user interface of a client device. Content related to the search terms, words, or phrases are rendered for display to a user using a client device whenever the user enters the keyword into a search engine interface (e.g. Google, Bing, Yahoo, Baidu, and the like) via the client device. The keyword may describe or be associated with device rendered objects provided by a device rendered object service. The keyword may be selected by the device rendered object service as a digital content object for which to submit an electronic bid value for search engine marketing to help determine when and where content provided by the device rendered object service may appear on a search engine results page displayed on a graphical user interface for a user using a client device.

As used herein, the term "electronic bid value" refers to a digital representation of an amount of currency a device rendered object service is willing to have deducted from a currency account for a keyword each time a user searches the keyword as described above and interacts, via a client device, with content provided by the device rendered object service that is associated with the keyword.

As used herein, the term "network time period" refers to an electronically recorded period of time determined by a start timestamp and a finish timestamp, which are defined below. In one example, a network time period may be a 24-hour period determined by a time difference between a finish time and a start time, where the finish time is recorded by a finish timestamp and the start time is recorded by a start timestamp.

As used herein, the term "timestamp" refers to one or more items of data including an electronic record of the network time of occurrence of a particular event. As used herein, the term "start timestamp" refers to an electronic record of the starting time of a network time period. As used herein, the term "finish timestamp" refers to an electronic record of the ending time of a network time period. In the example of a 24-hour period as a network time period, a start timestamp may be an electronic record representing a starting time of the network time period as midnight 00:00 at a given date, where the starting time of the network time period may be associated with a geolocation and a time zone of a client device. In such an example, a finish timestamp may be an electronic record representing an ending time of the network time period as midnight 24:00 at the end of the given date, where the starting time of the network time period may be associated with the geolocation and the time zone of the client device.

As used herein, the term "network time period segment" refers to an electronically recorded sub-period of time dividing the network time period. In the example of a 24-hour period as a network time period, a segment may be a 1-hour period dividing the network time period into 24 segments.

As used herein, the term "transaction signal" refers to an electronic signal received by a server from a client device that is associated with a user profile, where the transaction signal indicates the client device associated with the user profile has completed a transaction with a device rendered object. The transaction signal may include information associated with the user profile that completed a transaction via the client device.

As used herein, the term "cumulative transaction value" refers to a value programmatically generated by a server based on a total number of transaction signals received by the server from a client device during a network time period segment within a network time period.

As used herein, the term "accrued cumulative transaction value" refers to a value programmatically generated by a server based on cumulating different sets of cumulative transaction values (defined above) associated with a common network time period segment.

As used herein, the term "slope value" refers to a ratio of a vertical change to a horizontal change between any two distinct points on a line representing a linear function associated with a linear model defined above. The slope value or gradient of a line is a number that may describe a steepness of the line representing the linear function associated with the linear model defined above.

As used herein, the term "linearly scaling" refers to a method for rescaling a set of numerical values from a first scale to a second scale. In the linear scaling method, any difference between two numerical values within a full scale of the first scale is perceived to be directly proportional to the difference of two rescaled numerical values within a full scale of the second scale. In one embodiment, slope values range from 1 to 10 may be linearly scaled to a range of 1 to 1.5. In such an embodiment, a slope value of 5.5 within a first scale of 1 to 10 may be deemed as a rescaled slope value of 1.25 within a second scale of 1 to 1.5. In such an embodiment, a difference between 1 and 5.5 within the full scale of 1 to 10 is directly proportional to the difference between 1 and 1.25 within the full scale of 1 to 1.25.

As used herein, the term "multiplier values" refers to a set of values programmatically generated by a server based on each respective slope value (defined above) associated with a respective network time period segment.

As used herein, the term "transaction trend" refers to a condition of increasing or decreasing numbers of transactions during a network time period segment, where the transaction trend is associated with the slope value defined above. In one embodiment, a large slope value may represent an increasing trend of transactions during a particular network time period segment.

As used herein, the term "threshold slope value" refers to a value used to determine whether a transaction trend is increasing or decreasing during a particular network time period segment. In one embodiment, when a slope value is larger than a first threshold slope value, the transaction trend may be deemed an increasing transaction trend during a particular network time period segment, and thus associated electronic bid values during that particular network time period segment may be increased. In such an embodiment, the first threshold slope value may be 1. In another embodiment, when a slope value is smaller than a second threshold slope value, the transaction trend may be deemed a decreasing transaction trend during a particular network time period segment, and thus associated electronic bid values during that particular network time period segment may be decreased. In such an embodiment, the second threshold slope value may be −1.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Methods, apparatuses, and computer program products of the present disclosure may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Example System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate. Client devices may access a device rendered object system 115 via a communications network 102 (e.g., the Internet, LAN, WAN, or the like) using client devices 101A-101N. The device rendered object system 115 may comprise a server 107 in communication with one or more databases or repositories 108, 109, 110.

The server 107 may be embodied as a computer or computers as known in the art. The server 107 may provide for receiving of electronic data from various sources, including but not necessarily limited to the client devices 101A-101N. For example, the server 107 may be operable to receive transaction signals transmitted by the client devices 101A-101N. The server 107 may facilitate the generation and providing of various search results comprising digital content objects.

The databases or repositories 108-110 may be embodied as a data storage device such as a Network Attached Storage (NAS) device or devices, or as a separate database server or servers. The databases 108-110 include information accessed and stored by the server 107 to facilitate the operations of the device rendered object system 115. For example, the databases 108-110 may include, without limitation, client profiles for users of the system 115, electronic bid values, slop values, cumulative transaction values, device rendered objects, digital content objects, and/or the like.

Electronic bid values repository 110 may include mappings of each electronic bid value and each network time period segment associated with a digital content object.

Slope value repository 109 may include one or more slope values each representing a transaction trend of a digital content object during a particular network time period segment associated with a particular slope value.

Cumulative transaction values repository 108 may include one or more values associated with each network time period segment, where each cumulative transaction value is generated based on a total number of received transaction signals during each network time period segment.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the system 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally or alternatively, the client device 101A-101N may interact with the system 115 via a web browser. As yet another example, the client device 101A-101N may include various hardware or firmware designed to interface with the system 115.

It will be appreciated that repositories 108-110 may be one or more repositories, and may be part of or separate from server 107.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, and machine learning model circuitry 206. The apparatus 200 may be configured to execute the operations described herein. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Machine learning model circuitry 206 includes hardware configured to programmatically generate the values used herein for predictively determining how to adjust an electronic bid value for a digital content object. The machine learning model circuitry may utilize processing circuitry, such as the processor 202, to perform these actions. However, it should also be appreciated that, in some embodiments, the client action vector management circuitry may include a separate processor, specially configured field programmable gate array (FPGA), or application specific interface circuit (ASIC) for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

FIG. 3 illustrates an exemplary plurality of network time periods, each divided by multiple network time period segments according to one embodiment of the present disclosure. The exemplary network time period 300 is associated with a start timestamp and a finish timestamp. In one embodiment, the exemplary network time period 300 may be a 24-hour period determined by a time difference between the start timestamp and the finish timestamp. In such an embodiment, the exemplary network time period 300 may be divided by 24 network time period segments, where each network time period segment is a 1-hour period. Furthermore, a cumulative transaction value may be generated for each network time period segment based on a total number of transaction signals received during a particular network time period segment within the network time period 300.

FIG. 4 illustrates an exemplary process for adjusting an electronic bid value according to one embodiment of the present disclosure.

The method 400 begins with receiving, from one or more client devices, one or more transaction signals associated with the digital content object 401. In one embodiment, the digital content object is a keyword.

The method 400 continues with programmatically generating a first set of cumulative transaction values, where each cumulative transaction value of the first set of cumulative transaction values is associated with a different one of the one or more network time period segments within a first network time period 402. In one embodiment, each cumulative transaction value of the first set of cumulative transaction values is programmatically generated based on a total number of the one or more transaction signals received during each of the one or more network time period segments within the first network time period. In one embodiment, each of the one or more network time periods is associated with a start timestamp and a finish timestamp. In one embodiment, a time period between the start timestamp and the finish timestamp is 24-hours and each of the one or more network time period segments dividing the one or more network time periods is a 1-hour period.

The method 400 continues with programmatically generating a second set of cumulative transaction values, where each cumulative transaction value of the second set of cumulative transaction values is associated with a different one of the one or more network time period segments within a second network time period 403. In one embodiment, each cumulative transaction value of the second set of cumulative transaction values is programmatically generated based on a total number of the one or more transaction signals received during each of the one or more network time period segments within the second network time period.

The method 400 continues with programmatically generating an accrued cumulative transaction value for each of the one or more network time period segments based on cumulating the first set of cumulative transaction values for each of the one or more network time period segments within the first network time period and the second set of cumulative transaction values for each of the one or more network time period segments within the second network time period 404.

The method 400 continues with programmatically generating, using a machine learning model, a slope value based on the accrued cumulative transaction value for each of the one or more network time period segments 405. In one embodiment, the slope value is associated with a particular network time period segment and indicates a transaction trend of the digital content object during the particular network time period segment. In one embodiment, the machine learning model may be a linear model. In such an embodiment, the linear model may be a linear regression model, where the linear regression model is associated with an r-squared value and a p-value.

The method 400 continues with programmatically adjusting the electronic bid value of the digital content object during the particular network time period segment based at least on the slope value 406.

FIG. 5 illustrates an exemplary process for determining whether to adjust an electronic bid value according to one embodiment of the present disclosure.

The method 500 begins with determining whether a slope value is larger than a first threshold slope value, an r-squared value is larger than a threshold r-squared value, or a p-value is smaller than a threshold p-value 501. In one embodiment, the first threshold slope value is 1, the threshold r-squared value is 0.75, and the threshold p-value is 10-5.

In circumstances where the slope value is larger than the first threshold slope value, the r-squared value is larger than the threshold r-squared value, or the p-value is smaller than the threshold p-value, the electronic bid value for the digital content object may be increased during the particular network time period segment associated with the slope value 502.

The method 500 may also begin with determining whether a slope value is smaller than a second threshold slope value, an r-squared value is not larger than a threshold r-squared value, or a p-value is not smaller than a threshold p-value 503. In one embodiment, the second threshold slope value is −1, the threshold r-squared value is 0.75, and the threshold p-value is $10^{-5}$.

In circumstances where the slope value is smaller than the second threshold slope value, the r-squared value is not larger than the threshold r-squared value, or the p-value is not smaller than the threshold p-value, the electronic bid value for the digital content object may be decreased during the particular network time period segment associated with the slope value 504.

FIG. 6 illustrates an exemplary process for adjusting an electronic bid value of a digital content object based on multiplier values associated with respective slope values according to one embodiment of the present disclosure.

The method 600 begins with programmatically generating one or more multiplier values associated with each of the one or more network time period segments for determining one or more new electronic bid values for the digital content object during each of the one or more network time period segments 601. In one embodiment, each of the one or more multiplier values is associated with a respective slope value associated with the network time period segment indicating the transaction trend of the digital content object during the network time period segment-.

In circumstances where the respective slope value is in a range of 1 to 10 (602), the method 600 continues with programmatically generating a multiplier value associated with the particular network time period segment based on linearly scaling the respective slope value to a range of 1 to 1.5 (603).

In circumstances where the respective slope value is in a range of −10 to −1 (604), the method 600 continues with programmatically generating a multiplier value associated with the particular network time period segment based on linearly scaling the respective slope value to a range of 0.5 to 1 (605).

In circumstances where the respective slope value is in a range of −1 to 1 (606), the method 600 continues with programmatically generating a multiplier value associated with the particular network time period segment to be 1 (607).

The method 600 continues with determining the one or more new electronic bid values for the digital content object during each of the one or more network time period segments by multiplying an existing electronic bid value for the digital content object by the one or more multiplier values associated with each of the one or more network time period segments 608.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method, comprising:
   receiving one or more transaction signals associated with a digital content object;
   generating a first set of cumulative transaction values, each cumulative transaction value of the first set of cumulative transaction values associated with a different one of one or more network time period segments within a first network time period, wherein each cumulative transaction value of the first set of cumulative transaction values is programmatically generated based on a total number of the one or more transaction signals received during each of the one or more network time period segments within the first network time period;

generating a second set of cumulative transaction values, each cumulative transaction value of the second set of cumulative transaction values associated with a different one of the one or more network time period segments within a second network time period, wherein each cumulative transaction value of the second set of cumulative transaction values is programmatically generated based on a total number of the one or more transaction signals received during each of the one or more network time period segments within the second network time period;

generating an accrued cumulative transaction value for each of the one or more network time period segments based on cumulating the first set of cumulative transaction values for each of the one or more network time period segments within the first network time period and the second set of cumulative transaction values for each of the one or more network time period segments within the second network time period;

generating, using a machine learning model, a slope value based on the accrued cumulative transaction value for each of the one or more network time period segments, wherein the slope value is associated with a particular network time period segment and indicates a transaction trend of the digital content object during the particular network time period segment; and adjusting an electronic bid value of the digital content object during the particular network time period segment based at least on the slope value.

2. The computer-implemented method of claim 1, wherein the machine learning model is a linear model.

3. The computer-implemented method of claim 2, wherein the linear model is a linear regression model associated with an r-squared value and a p-value.

4. The computer-implemented method of claim 3, further comprising:
responsive to determining that the slope value is larger than a first threshold slope value, the r-squared value is larger than a threshold r-squared value, or the p-value is smaller than a threshold p-value:
increasing the electronic bid value for the digital content object during the particular network time period segment associated with the slope value.

5. The computer-implemented method of claim 4, wherein the first threshold slope value is 1, the threshold r-squared value is 0.75, and the threshold p-value is $10^{-5}$.

6. The computer-implemented method of claim 3, further comprising:
responsive to determining that the slope value is smaller than a second threshold slope value, the r-squared value is not larger than the threshold r-squared value, or the p-value is not smaller than a threshold p-value:
decreasing the electronic bid value for the digital content object during the particular network time period segment associated with the slope value.

7. The computer-implemented method of claim 6, wherein the second threshold slope value is −1, a first threshold slope value is 1, the threshold r-squared value is 0.75, and the threshold p-value is $10^{-5}$.

8. The computer-implemented method of claim 1, wherein each of the one or more network time periods is associated with a start timestamp and a finish timestamp.

9. The computer-implemented method of claim 8, wherein a time period between the start timestamp and the finish timestamp is 24-hours.

10. The computer-implemented method of claim 1, wherein each of the one or more network time period segments dividing the one or more network time periods is a 1-hour period.

11. The computer-implemented method of claim 1, further comprising:
generating one or more multiplier values associated with each of the one or more network time period segments for determining one or more new electronic bid values for the digital content object during each of the one or more network time period segments, wherein each of the one or more multiplier values is associated with a respective slope value associated with the particular network time period segment indicating the transaction trend of the digital content object during the particular network time period segment.

12. The computer-implemented method of claim 11, further comprising:
responsive to determining that the respective slope value is in a range of 1 to 10, generating a multiplier value associated with the particular network time period segment based on linearly scaling the respective slope value to a range of 1 to 1.5.

13. The computer-implemented method of claim 11, further comprising:
responsive to determining that the respective slope value is in a range of −10 to −1, generating a multiplier value associated with the particular network time period segment based on linearly scaling the respective slope value to a range of 0.5 to 1.

14. The computer-implemented method of claim 11, further comprising:
responsive to determining that the respective slope value is in a range of −1 to 1, generating a multiplier value associated with the particular network time period segment to be 1.

15. The computer-implemented method of claim 11, further comprising:
determining the one or more new electronic bid values for the digital content object during each of the one or more network time period segments by multiplying an existing electronic bid value for the digital content object by the one or more multiplier values associated with each of the one or more network time period segments.

16. The computer-implemented method of claim 1, wherein the digital content object is a keyword.

17. An apparatus comprising at least one processor and at least one memory including computer program code, the at least one memory and the computer program code configured to, with the at least one processor, cause the apparatus to:
receive one or more transaction signals associated with a digital content object;
generate a first set of cumulative transaction values, each cumulative transaction value of the first set of cumulative transaction values associated with a different one of one or more network time period segments within a first network time period, wherein each cumulative transaction value of the first set of cumulative transaction values is programmatically generated based on a total number of the one or more transaction signals received during each of the one or more network time period segments within the first network time period;

generate a second set of cumulative transaction values, each cumulative transaction value of the second set of cumulative transaction values associated with a different one of the one or more network time period segments within a second network time period, wherein each cumulative transaction value of the second set of cumulative transaction values is programmatically generated based on a total number of the one or more transaction signals received during each of the one or more network time period segments within the second network time period;

generate an accrued cumulative transaction value for each of the one or more network time period segments based on cumulating the first set of cumulative transaction values for each of the one or more network time period segments within the first network time period and the second set of cumulative transaction values for each of the one or more network time period segments within the second network time period;

generate, using a machine learning model, a slope value based on the accrued cumulative transaction value for each of the one or more network time period segments, wherein the slope value is associated with a particular network time period segment and indicates a transaction trend of the digital content object during the particular network time period segment; and adjust an electronic bid value of the digital content object during the particular network time period segment based at least on the slope value.

18. A non-transitory computer-readable storage medium having instructions stored thereon that, with one or more processors of an apparatus, cause the apparatus to:

receive one or more transaction signals associated with a digital content object;

generate a first set of cumulative transaction values, each cumulative transaction value of the first set of cumulative transaction values associated with a different one of one or more network time period segments within a first network time period, wherein each cumulative transaction value of the first set of cumulative transaction values is programmatically generated based on a total number of the one or more transaction signals received during each of the one or more network time period segments within the first network time period;

generate a second set of cumulative transaction values, each cumulative transaction value of the second set of cumulative transaction values associated with a different one of the one or more network time period segments within a second network time period, wherein each cumulative transaction value of the second set of cumulative transaction values is programmatically generated based on a total number of the one or more transaction signals received during each of the one or more network time period segments within the second network time period;

generate an accrued cumulative transaction value for each of the one or more network time period segments based on cumulating the first set of cumulative transaction values for each of the one or more network time period segments within the first network time period and the second set of cumulative transaction values for each of the one or more network time period segments within the second network time period;

generate, using a machine learning model, a slope value based on the accrued cumulative transaction value for each of the one or more network time period segments, wherein the slope value is associated with a particular network time period segment and indicates a transaction trend of the digital content object during the particular network time period segment; and adjust an electronic bid value of the digital content object during the particular network time period segment based at least on the slope value.

* * * * *